United States Patent
Sato et al.

(10) Patent No.: US 11,945,474 B2
(45) Date of Patent: Apr. 2, 2024

(54) DRIVING ASSISTANCE APPARATUS, AND VEHICLE

(71) Applicant: Panasonic Intellectual Property Management Co., Ltd., Osaka (JP)

(72) Inventors: Takehito Sato, Tokyo (JP); Atsushi Nojiri, Tokyo (JP); Satoshi Fukumoto, Tokyo (JP); Yoshimasa Okabe, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 123 days.

(21) Appl. No.: 17/329,838

(22) Filed: May 25, 2021

(65) Prior Publication Data

US 2022/0379925 A1 Dec. 1, 2022

(51) Int. Cl.
*B60W 60/00* (2020.01)
*G06V 20/56* (2022.01)

(52) U.S. Cl.
CPC .... *B60W 60/0054* (2020.02); *B60W 60/0059* (2020.02); *G06V 20/56* (2022.01); *B60W 2420/42* (2013.01)

(58) Field of Classification Search
CPC ......... B60W 60/0054; B60W 60/0059; B60W 2420/42; G06V 20/56
See application file for complete search history.

(56) References Cited

U.S. PATENT DOCUMENTS

| 2016/0075331 A1* | 3/2016 | Tomozawa | B60W 30/06 |
| | | | 701/41 |
| 2016/0075374 A1* | 3/2016 | Yamashita | B62D 15/0285 |
| | | | 701/41 |

(Continued)

FOREIGN PATENT DOCUMENTS

| JP | 2010-186257 | 8/2010 |
| JP | 2016-060232 | 4/2016 |

(Continued)

OTHER PUBLICATIONS

English language translation of the Notice of Reasons for Refusal from Japan Patent Office (JPO) in Japanese Patent Appl. No. 2019-049847, dated Aug. 30, 2022.

*Primary Examiner* — Jean Paul Cass
*Assistant Examiner* — Alexander George Matta
(74) *Attorney, Agent, or Firm* — GREENBLUM & BERNSTEIN, P.L.C.

(57) ABSTRACT

A driving assistance apparatus configured to support a driving of a vehicle at a time of pulling out of the vehicle, the driving assistance apparatus including: a control section configured to determine a movement path from a parking space to a predetermined position of a road region, and run the vehicle along the movement path on a basis of surroundings information of the vehicle when pulling out the vehicle from the parking space to the road region, wherein the control section leaves an accelerator operation for the vehicle to a user while automatically controlling a steering operation for the vehicle at least in a section in the move- (Continued)

ment path, and switches from an automated driving mode to a manual driving mode in response to the steering operation that is performed by the user when the vehicle travels in the section.

4 Claims, 7 Drawing Sheets

(56) References Cited

U.S. PATENT DOCUMENTS

| | | | |
|---|---|---|---|
| 2019/0009773 A1* | 1/2019 | Miyahara | B62D 15/028 |
| 2019/0185055 A1* | 6/2019 | Iwami | B62D 15/028 |
| 2021/0179081 A1* | 6/2021 | Hara | B60W 10/20 |

FOREIGN PATENT DOCUMENTS

| | | |
|---|---|---|
| JP | 2017-065360 | 4/2017 |
| JP | 2017-068440 | 4/2017 |
| JP | 2017-068441 | 4/2017 |
| JP | 2020-152148 | 9/2020 |

* cited by examiner

DRIVING ASSISTANCE APPARATUS, AND VEHICLE

TECHNICAL FIELD

The present disclosure relates to a driving assistance apparatus and a vehicle.

BACKGROUND ART

A driving assistance apparatus that reduces the burden of the driver by supporting the driving operation of a vehicle is known (see, for example, PTL 1).

CITATION LIST

Patent Literature

PTL 1
Japanese Patent Application Laid-Open No. 2010-186257

Incidentally, for driving assistance apparatuses of the above-described type, there is a demand to support the driving operation during pulling out of the vehicle. Fine steering operations are required for the driving operation during pulling out of the vehicle, which is a large burden for a driver (hereinafter referred to as "user"), and therefore it is useful if the driving operation during pulling out can be supported by automated driving (hereinafter referred to also as "automated pulling out").

It should be noted that in automated driving of driving assistance apparatuses of the above-described type, it is necessary to switch from the automated driving mode to the manual driving mode at some timing after the driving operation of the vehicle is supported. Then, if the switch from the automated driving mode to the manual driving mode is not smoothly performed, the vehicle is stopped at an inappropriate position, and accidental contact with another vehicle may result.

Figure 1:
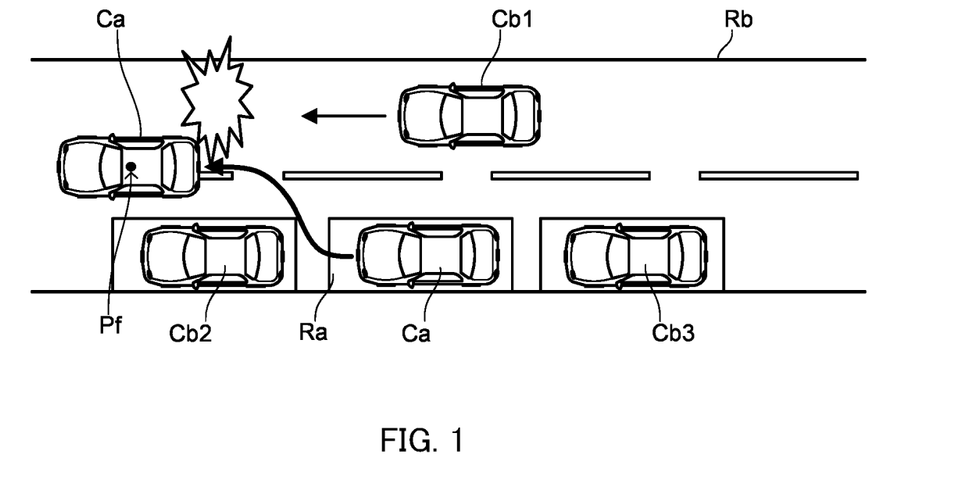
FIG. 1 is a diagram illustrating an automated pulling-out operation of a driving assistance apparatus performed by a known technology.

FIG. 1 is a diagram illustrating an example of an automated pulling-out operation performed by a driving assistance apparatus of a known technology. Note that in FIG. 1, Ra represents a parking space, Rb a road region, Ca a vehicle that performs automated pulling out, Cb1 another vehicle travelling in road region Rb, Cb2 and Cb3 obstacles (here, another vehicle during parking), Pf a pulling-out completion position, and the arrow a movement path of vehicle Ca during automated pulling out.

Typically, as illustrated in FIG. 1, a driving assistance apparatus of a known technology performs an operation of stopping the vehicle at pulling-out completion position Pf to change the mode from the automated driving mode to the manual driving mode after moving vehicle Ca from parking space Ra to pulling-out completion position Pf in road region Rb. However, such a vehicle operation cannot be anticipated from another vehicle Cb1. As such, the driving assistance apparatus of the known technology may cause collision with another vehicle Cb1 when vehicle Ca is stopped at pulling-out completion position Pf.

SUMMARY OF INVENTION

Solution to Problem

In view of the above-described problems, an object of the present disclosure is to provide a driving assistance apparatus and a vehicle that can achieve an automated pulling-out function that is more suitable in terms of safety and consideration for other vehicles.

A driving assistance apparatus according the present disclosure for solving the above-described problems is configured to support a driving of a vehicle at a time of pulling out of the vehicle, the driving assistance apparatus including: an input section configured to receive an input of sensor information from a sensor configured to monitor surroundings of the vehicle; and a control section configured to determine a movement path from a parking space to a predetermined position of a road region, and run the vehicle along the movement path on a basis of surroundings information of the vehicle when pulling out the vehicle from the parking space to the road region, wherein the control section leaves an accelerator operation for the vehicle to a user while automatically controlling a steering operation for the vehicle at least in a section in the movement path, and switches from an automated driving mode to a manual driving mode in response to the steering operation that is performed by the user when the vehicle travels in the section.

A vehicle of another aspect of the present disclosure includes the above-described driving assistance apparatus.

Advantageous Effects of Invention

The driving assistance apparatus according to the present disclosure can achieve an automated pulling-out function that is more suitable in terms of safety and consideration for other vehicles.

DESCRIPTION OF EMBODIMENTS

An embodiment of the present disclosure is described in detail below with reference to the drawings. Note that in the specification and drawing, components having substantially the same functions are denoted with the same reference numerals and overlapping description is omitted.

Configuration of Vehicle

First, an example of a configuration of a vehicle according to the embodiment is described with reference to FIG. 2. Note that in the following description, the term "vehicle" means a vehicle in which a driving assistance apparatus that performs automated pulling out is mounted, and the vehicle in which the driving assistance apparatus is mounted is referred to as "another vehicle" when describing there is another vehicle.

Figure 2:
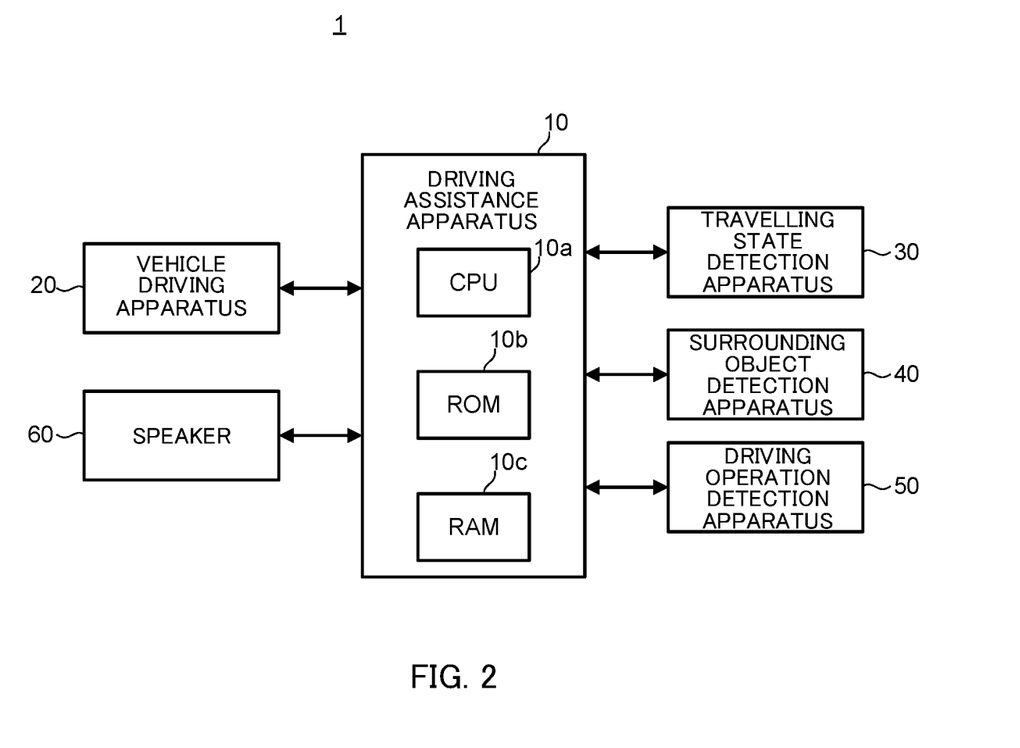
FIG. 2 is a drawing illustrating a configuration of a vehicle according to an embodiment.

FIG. 2 is a drawing illustrating a configuration of vehicle 1 according to the present embodiment.

Vehicle 1 includes driving assistance apparatus 10, vehicle driving apparatus 20, travelling state detection apparatus 30, surrounding object detection apparatus 40, driving operation detection apparatus 50, and speaker 60.

Vehicle driving apparatus 20 is a means for achieving driving, braking, and a turning motion required for the travelling of vehicle 1, and includes, for example, a drive motor, a power transmission mechanism, a brake apparatus, and a steering apparatus and the like, and an electronic control apparatus for controlling them. Vehicle driving apparatus 20 runs vehicle 1 by, for example, generating power by the drive motor, and transmitting the power to the wheels through a power transmission mechanism (such as a propeller shaft, a differential gear and a drive shaft). Note that vehicle driving apparatus 20 according to the present embodiment is configured such that its operation can be controlled by driving assistance apparatus 10.

Travelling state detection apparatus 30 is a sensor of various types that detects the travelling state (hereinafter referred to as "travelling state information") of vehicle 1. Travelling state detection apparatus 30 includes, for example, an acceleration sensor that detects acceleration acting in the front-rear direction, a torque sensor that detects a torque acting on the power transmission mechanism between the engine and the wheels of vehicle 1, an accelerator position sensor that detects the accelerator position, a steering angle sensor that detects the steering angle of the steering apparatus, a vehicle speed sensor that detects the vehicle speed of vehicle 1, a wheel speed sensor and the like. Travelling state detection apparatus 30 outputs the travelling state information of vehicle 1 detected by itself to driving assistance apparatus 10.

Surrounding object detection apparatus 40 is a sensor that detects the position of an object surrounding vehicle 1 (hereinafter referred to as "surroundings information"), and includes, for example, an in-vehicle camera, an infrared ray sensor, a sonar, a radar and the like. For example, surrounding object detection apparatus 40 is disposed at the four corners and/or front, rear, left and right positions of vehicle 1 such that it can detect objects in each direction around vehicle 1. Surrounding object detection apparatus 40 outputs the surroundings information of vehicle 1 detected by itself to driving assistance apparatus 10.

Note that typically, the surroundings information of vehicle 1 detected by surrounding object detection apparatus 40 is information of obstacles around vehicle 1, and represents a region where vehicle 1 can travel.

Driving operation detection apparatus 50 is a sensor of various types that detects operations made by the user (hereinafter referred to as "operation information"), and includes, for example, an accelerator sensor that detects an accelerator operation (for example, a pressing amount of an accelerator pedal), a steering sensor that detects a steering operation (for example, a rotation amount of the steering wheel) and the like. Driving operation detection apparatus 50 outputs the operation information detected by itself to driving assistance apparatus 10.

Speaker 60 is a notification means that transmits information required for the user using a sound. Speaker 60 outputs a sound on the basis of a command signal from driving assistance apparatus 10.

Driving assistance apparatus 10 is an electronic control unit that generally controls each part of vehicle 1. For example, driving assistance apparatus 10 is mutually connected with vehicle driving apparatus 20, travelling state detection apparatus 30, surrounding object detection apparatus 40, driving operation detection apparatus 50, and speaker 60 through an in-vehicle network (for example, a communication network complying with a CAN communication protocol) so as to be able to exchange required data and control signals.

Driving assistance apparatus 10 controls vehicle driving apparatus 20 (for example, transmission of command values of the steering angle, deceleration, acceleration, and vehicle speed) to optimize the travelling state of vehicle 1 with reference to sensor information from travelling state detection apparatus 30 and driving operation detection apparatus 50. Note that driving assistance apparatus 10 according to the present embodiment can automatically drive vehicle 1 by controlling vehicle driving apparatus 20 on the basis of the travelling state information of vehicle 1, the surroundings information of vehicle 1 and the operation information of vehicle 1 (details are described later).

Driving assistance apparatus 10 includes, for example, central processing unit (CPU) 10a, read only memory (ROM) 10b, random access memory (RAM) 10c, an input port (not illustrated), an output port (not illustrated) and the like. The functions of driving assistance apparatus 10 are achieved when CPU 10a refers to control programs and/or various data stored in ROM 10b and/or RAM 10c, for example.

Note that vehicle information required for automated driving of vehicle 1, such as the size of vehicle 1 and the minimum rotation radius of vehicle 1, is also stored in ROM 10b.

Configuration of Driving Assistance Apparatus

Next, a configuration of driving assistance apparatus 10 according to the present embodiment is described with reference to FIGS. 3 and 4. Here, only a configuration for driving assistance apparatus 10 according to the present embodiment to perform automated pulling out of vehicle 1 is described.

Figure 3:
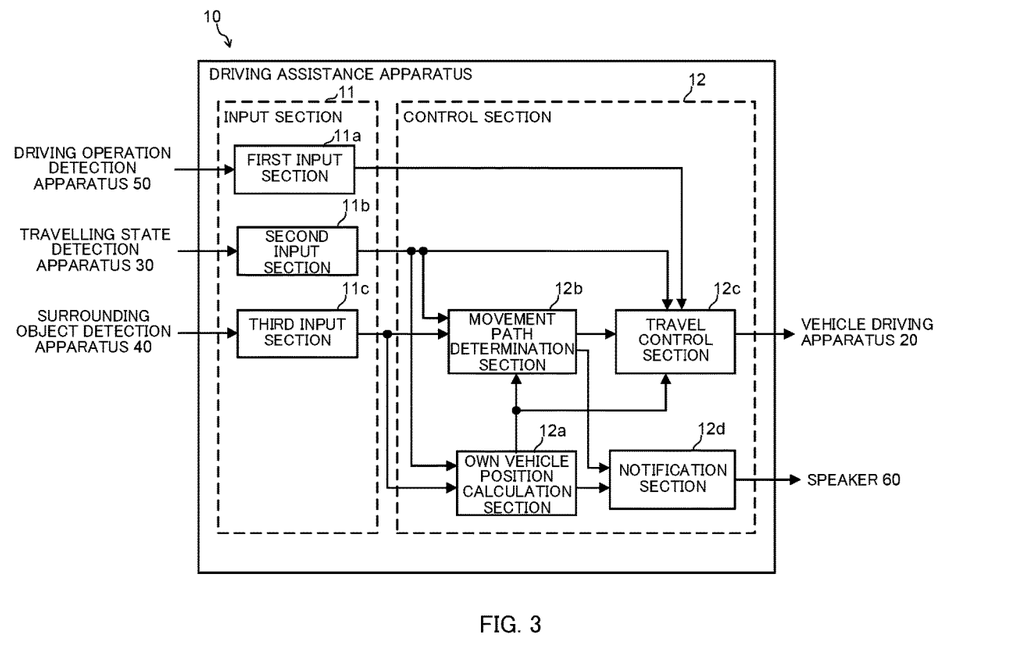
FIG. 3 is a diagram illustrating a functional block of a driving assistance apparatus according to the embodiment.

FIG. 3 is a diagram illustrating a functional block of driving assistance apparatus 10 according to the present embodiment. Note that the arrows in FIG. 3 indicate transmission paths of signals.

Driving assistance apparatus 10 according to the present embodiment includes input section 11 and control section 12.

Input section 11 includes first input section 11a, second input section 11b, and third input section 11c.

First input section 11a receives an input of operation information of the user from driving operation detection apparatus 50, and outputs the input operation information to travel control section 12c. Second input section 11b receives an input of information about the travelling state of vehicle 1 from travelling state detection apparatus 30, and outputs information about the input travelling state to own vehicle position calculation section 12a, movement path determination section 12b, and travel control section 12c. Third input section 11c receives an input of the surroundings information of vehicle 1 from surrounding object detection apparatus 40, and outputs the input surroundings information to own vehicle position calculation section 12a, movement path determination section 12b, and travel control section 12c.

Control section 12 includes own vehicle position calculation section 12a, movement path determination section 12b, travel control section 12c, and notification section 12d.

Own vehicle position calculation section 12a calculates the current position of vehicle 1 as a relative position of vehicle 1 and a surrounding object on the basis of the surroundings information of vehicle 1 (for example, information representing a position of an object around vehicle 1). In addition, own vehicle position calculation section 12a calculates the current position of vehicle 1 as a relative position from a certain point by adding up the movement amount of vehicle 1 on the basis of the travelling state information of vehicle 1 (for example, the steering angle, vehicle speed and the like of vehicle 1).

When automatically pulling out vehicle 1, movement path determination section 12b determines the movement path for pulling out vehicle 1 from the parking space to the road region on the basis of the current position of vehicle 1, the surroundings information of vehicle 1 and the like. Here, the road region is a region where the vehicle travels, which can be a public road, a private road, or an area other than a parking space in a parking lot.

For example, first, movement path determination section 12b recognizes the movable range of vehicle 1 on the basis of the current position of vehicle 1, the surroundings information of vehicle 1, and the vehicle information (for example, the size of vehicle 1 and the minimum rotation radius of vehicle 1), and sets, at an appropriately position in the road region, a pulling-out completion position for completing the automated pulling out. Then, in the movable range of vehicle 1, movement path determination section 12b sets a plurality of movement path candidates to reach the pulling-out completion position from the initial position in the parking space, and calculates the costs (typically, transit time) of the plurality of movement path candidates. Then, movement path determination section 12b determines a movement path candidate with a smallest cost as the movement path for automated pulling out from among the plurality of movement path candidates.

In addition, after determining the movement path for automated pulling out, movement path determination section 12b sets a point for temporarily stopping vehicle 1 at a point before vehicle 1 completely advances to the road region in the movement path. This point for temporarily stopping vehicle 1 serves as the point of changing the automated driving mode described later (hereinafter referred to also as "mode change point"). Note that, for example, movement path determination section 12b discriminates the parking space and the road region on the basis of the surroundings information of vehicle 1 (for example, the shape of the movable range).

When automatically pulling out vehicle 1, travel control section 12c controls vehicle driving apparatus 20 to automatically (i.e., autonomously) move vehicle 1 along the movement path determined by movement path determination section 12b while referring to the current position of vehicle 1 input from own vehicle position calculation section 12a, the travelling state information of vehicle 1 input from travelling state detection apparatus 30, and the operation information of the user input from driving operation detection apparatus 50.

Here, travel control section 12c includes a first automated driving mode of automatically controlling both the accelerator operation and steering operation of vehicle 1, and a second automated driving mode of automatically controlling the steering operation of vehicle 1 while leaving the accelerator operation of vehicle 1 to the user. During automated pulling out, travel control section 12c changes stepwise the driving mode for controlling vehicle 1 from the first automated driving mode to the second automated driving mode, and then to a manual driving mode. In this manner, the switching between the automated driving and the manual operation is smoothly executed while minimizing the operation burden of the user.

Note that typically, the first automated driving mode is a mode in which all operations of vehicle driving apparatus 20 is automatically executed by driving assistance apparatus 10. On the other hand, the second automated driving mode is a mode in which only the accelerator operation of vehicle driving apparatus 20 is executed based on the pressing operation of the accelerator pedal performed by the user, and other operations are automatically executed by driving assistance apparatus 10.

Figure 4:
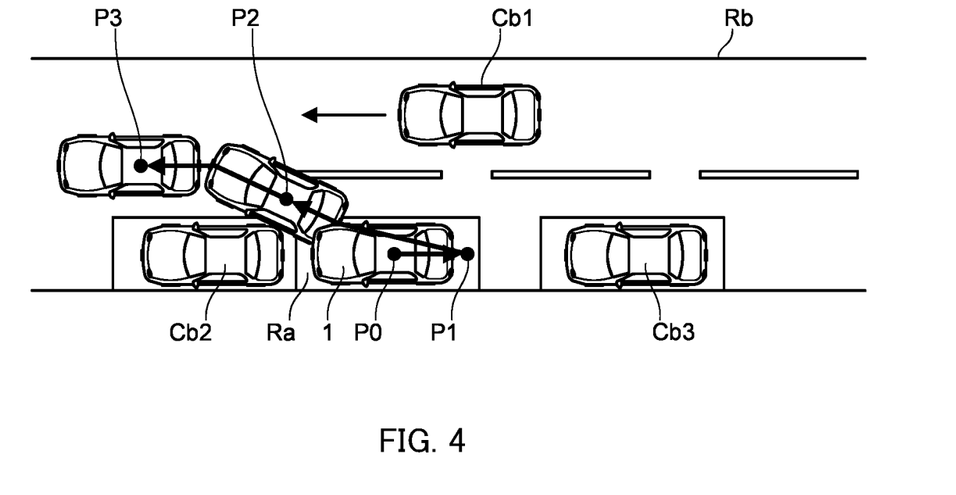
FIG. 4 is a diagram illustrating an example of an automated pulling-out operation performed by the driving assistance apparatus according to the embodiment.

FIG. 4 is a diagram illustrating an example of an automated pulling-out operation performed by driving assistance apparatus 10 according to the present embodiment. In FIG. 4, Ra represents a parking space, Rb a road region, Cb1 another vehicle travelling in road region Rb, and Cb2 and Cb3 obstacles around vehicle 1 (here, another vehicle during parking).

FIG. 4 illustrates a way of automatically pulling out parallel-parked vehicle 1 in parking space Ra to road region Rb. In FIG. 4, point P0 represents an initial position, points P1 and P2 intermediate positions in the movement path, point P3 a pulling-out completion position, and the heavy arrow a movement path of a vehicle during automated pulling out. Note that here, point P2 is the mode change point.

When automated pulling out is started, first, travel control section 12c runs vehicle 1 such that both the steering operation and accelerator operation are automatically controlled in the first automated driving mode in an initial section (point P0 to point P1 and point P1 to point P2) between position P0 and intermediate position P2 in the movement path. Here, in the region from point P0 to point P1, travel control section 12c runs vehicle 1 backward, turns it at point P1, and then runs it forward to point P2.

Next, travel control section 12c temporarily stops vehicle 1 at intermediate position P2, and changes the automated driving mode from the first automated driving mode to the second automated driving mode. Then, in the final section (point P2 to point P3) between intermediate position P2 and pulling-out completion position P3 in the movement path, travel control section 12c runs vehicle 1 such that the steering operation is automatically controlled while leaving the accelerator operation to the user in the second automated driving mode.

Then, travel control section 12c switches the mode from the automated driving mode (the second automated driving mode) to the manual driving mode in response to a steering operation that is performed by the user when vehicle 1 travels in the final section.

In this manner, it is possible to smoothly change the mode from the automated driving mode to the manual driving mode while moving vehicle 1 in road region Rb without stopping vehicle 1, at pulling-out completion position P3 of road region Rb.

Note that typically, the mode change point (intermediate position) is a position where no turning movement is required thereafter in the movement path, and is set to a point where vehicle 1 has entered road region Rb by a predetermined distance from parking space Ra (for example, a point where only the front part of vehicle 1 has entered road region Rb). In this manner, the driving operation by the user can be completely omitted in a region where safety is ensured, and the mode can be smoothly changed from the automated driving mode to the manual driving mode after entering road region Rb.

It should be noted that the reference for setting the mode change point may be appropriately changed in accordance with the way of the automated pulling out of vehicle 1 and the environment around vehicle 1. In addition, in the mode change point, travel control section 12c is not necessarily completely stop vehicle 1, and the vehicle speed of vehicle 1 may be reduced to a predetermined speed or lower.

Notification section 12d uses speaker 60 to urge the user to perform a predetermined driving operation during automated pulling out. For example, when the steering angle of vehicle 1 becomes a threshold value or smaller (for example, 5° or smaller) in vehicle 1 travelling in the final section, notification section 12d notifies the user to perform a steering operation. In this manner, it is possible to switch from the automated driving mode to the manual driving mode without making the user feel difficulty.

In addition, notification section 12d notifies the user to perform the accelerator operation when the vehicle makes a temporal stop at the mode change point.

Operation of Driving Assistance Apparatus

Next, an example of an operation of driving assistance apparatus 10 according to the present embodiment during automated pulling out is described with reference to FIG. 5.

Figure 5:
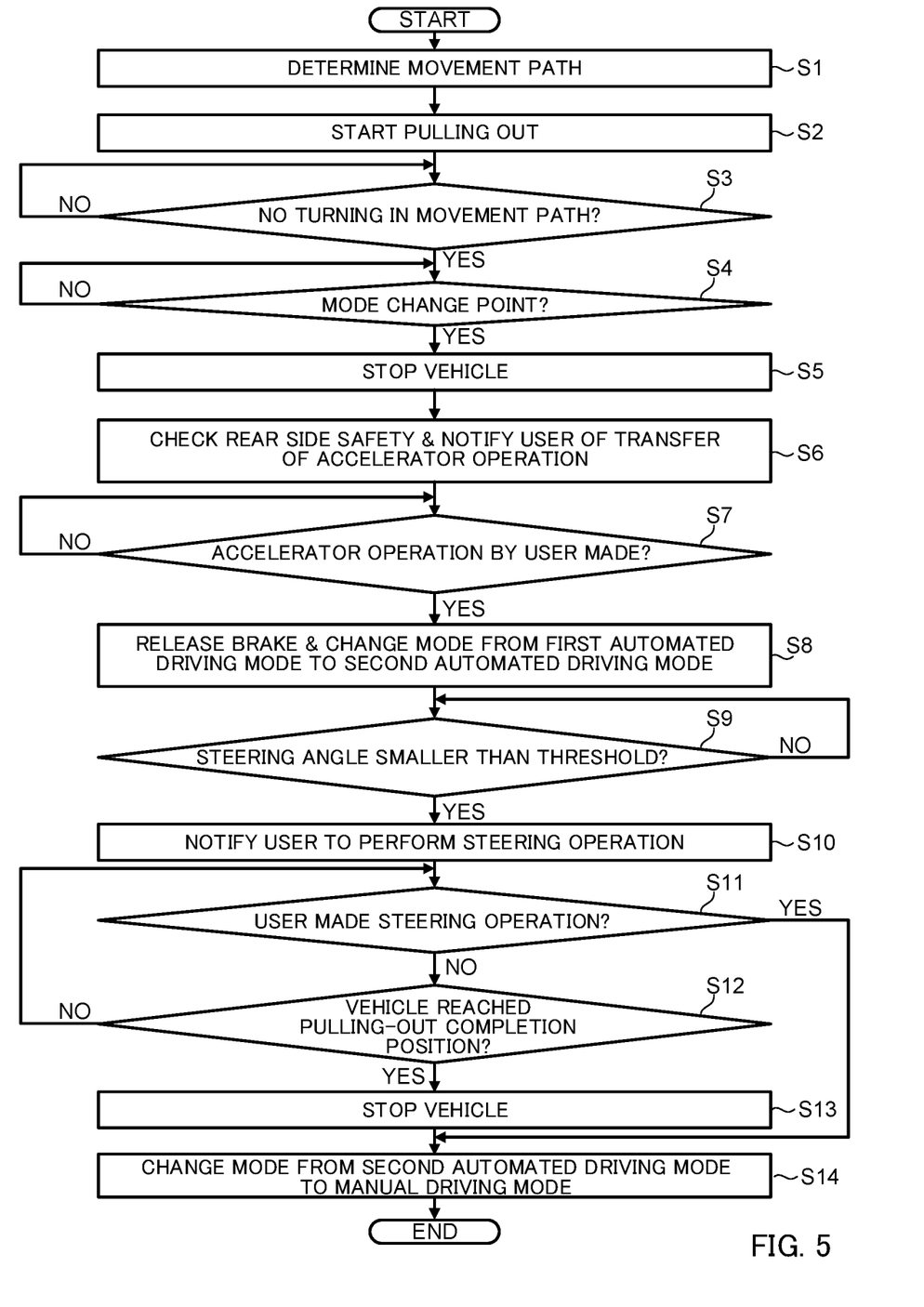
FIG. 5 is a flowchart of an operation of the driving assistance apparatus according to the embodiment.

FIG. 5 is a flowchart of an operation of driving assistance apparatus 10 according to the present embodiment.

Note that the flowchart of FIG. 5 is, for example, a process that is executed by driving assistance apparatus 10 in accordance with a computer program. The process of this flowchart is a process that is executed when, for example, the user makes an automated pulling out command to vehicle 1 through the use of an operation button provided in the driver's seat and the like.

At step S1, first, driving assistance apparatus 10 determines the movement path for pulling out vehicle 1 from parking space Ra to road region Rb on the basis of the current position of vehicle 1, the surroundings information of vehicle 1 and the like. In addition, at this time, driving assistance apparatus 10 also determines the pulling-out completion position and the mode change point in addition to the movement path.

At step S2, driving assistance apparatus 10 starts a pulling out movement of vehicle 1 by controlling vehicle driving apparatus 20. Note that at this time, driving assistance apparatus 10 runs vehicle 1 in the first automated driving mode.

Note that here, while the specific description of operations performed to vehicle 1 by driving assistance apparatus 10, such as the accelerator operation, steering operation, and shift operation, is omitted, driving assistance apparatus 10 runs vehicle 1 along the movement path by performing the accelerator operation, steering operation, shift operation and the like while detecting the own vehicle position of vehicle 1 and the travelling state of vehicle 1. The configuration of the driving mode is similar to publicly known automated driving operations.

At step S3, driving assistance apparatus 10 waits for advancement of vehicle 1 to a position where no turning movement is made in the movement path on the basis of sequentially calculated current positions of vehicle 1 while moving vehicle 1 along the movement path determined at step S1 (S3: NO). Then, when vehicle 1 has advanced to the position where no turning movement is made in the movement path (S3: YES), driving assistance apparatus 10 proceeds the process to step S4.

At step S4, driving assistance apparatus 10 waits for arrival of vehicle 1 to the mode change point in the movement path on the basis of sequentially calculated current positions of vehicle 1 while moving vehicle 1 along the movement path determined at step S1 (S4: NO). Then, when vehicle 1 has arrived at the mode change point in the movement path (S4: YES), driving assistance apparatus 10 proceeds the process to step S5.

At step S5, driving assistance apparatus 10 temporarily stops vehicle 1 at the mode change point by controlling vehicle driving apparatus 20. Note that in the movement path, the section before the mode change point corresponds to the above-mentioned initial section, and the section after the mode change point corresponds to the above-mentioned final section.

At step S6, driving assistance apparatus 10 checks the safety on the rear side of vehicle 1 in the road region on the basis of the surroundings information of vehicle 1, and uses speaker 60 to make a notification that the accelerator operation is transferred to the driver. At this time, when it is detected that another vehicle is approaching on the lateral rear side of vehicle 1 in the road region, driving assistance apparatus 10 uses speaker 60 to make a notification of that fact.

At step S7, driving assistance apparatus 10 waits for an accelerator operation performed by the user on the basis of operation information from driving operation detection apparatus 50 (S7: NO). Then, when an accelerator operation is performed by the user (S7: YES), driving assistance apparatus 10 proceeds the process to step S8.

At step S8, driving assistance apparatus 10 releases the brake by controlling vehicle driving apparatus 20, and restarts the running of vehicle 1 by changing driving mode from the first automated driving mode to the second automated driving mode. At this time, driving assistance apparatus 10 leaves the accelerator operation to the user, and automatically controls the steering operation.

At step S9, driving assistance apparatus 10 waits for vehicle 1 to advance along the movement path determined at step S2 and the steering angle to become a threshold value or smaller (for example, 5° or smaller) on the basis of the travelling state information from travelling state detection apparatus 30 (S9: NO). Then, when the steering angle becomes the threshold value or smaller (S9: YES), driving assistance apparatus 10 proceeds the process to step S10.

Note that at step S9, the state where the steering angle becomes the threshold value or smaller means that vehicle 1 has advanced to the road region and is travelling straight.

At step S10, driving assistance apparatus 10 uses speaker 60 to notify the user to perform the steering operation.

At step S11, driving assistance apparatus 10 determines whether the user has made a steering operation (i.e., whether the user has turned a steering wheel provided in vehicle 1) on the basis of operation information from driving operation detection apparatus 50. When the user has not made a steering operation (S11: NO), driving assistance apparatus 10 proceeds the process to step S12. When the user has made a steering operation (S11: YES), driving assistance apparatus 10 proceeds the process to step S14.

At step S12, driving assistance apparatus 10 determines whether vehicle 1 has reached the pulling-out completion position on the basis of sequentially calculated current positions of vehicle 1, while moving vehicle 1 along the movement path determined at step S1. When vehicle 1 has reached the pulling-out completion position (S12: YES), driving assistance apparatus 10 proceeds the process to step S13. When vehicle 1 has not reached the pulling-out completion position (S12: NO), driving assistance apparatus 10 returns the process to step S11 and waits for the user to perform a steering operation.

At step S13, driving assistance apparatus 10 stops vehicle 1 by controlling vehicle driving apparatus 20.

At step S14, driving assistance apparatus 10 changes the mode from the second automated driving mode to the manual driving mode, and leaves all operations for vehicle driving apparatus 20 to various operations of the user (for example, operations on the accelerator pedal, operations on steering wheel and the like).

Effect

As described above, in at least a section (for example, the final section) in the movement path during automated pulling out, driving assistance apparatus 10 according to the present embodiment leaves the accelerator operation for vehicle 1 to the user while automatically controlling the steering operation for vehicle 1, and performs switching from the automated driving mode to the manual driving mode in response to a steering operation that is performed by the user when vehicle 1 travels in that section.

Thus, driving assistance apparatus 10 according to the present embodiment can switch from the automated driving mode to the manual driving mode without stopping the vehicle in the road region after vehicle 1 is pulled out from the parking space to the road region.

In addition, driving assistance apparatus 10 according to the present embodiment has the first automated driving mode of automatically controlling both the accelerator operation and steering operation of vehicle 1 and the second automated driving mode of automatically controlling the steering operation of vehicle 1 while leaving the accelerator operation of vehicle 1 to the user, and changes stepwise the driving mode for controlling vehicle 1 from the first automated driving mode to the second automated driving mode, and then to the manual driving mode, during automated pulling out. In this manner, the switching from the automated driving to the manual operation can be smoothly performed while minimizing the operation burden of the user.

In addition, when vehicle 1 is travelling in the final section and the steering angle of vehicle 1 becomes the threshold value or smaller, driving assistance apparatus 10 according to the present embodiment causes the user to perform the steering operation. In this manner, it is possible to switch from the automated driving mode to the manual driving mode without making the user feel difficulty.

Modification 1

The above-described driving assistance apparatus 10 according to the embodiment is also applicable to other uses than the automated pulling-out operation of pulling out parallel-parked vehicle 1.

Figure 6:
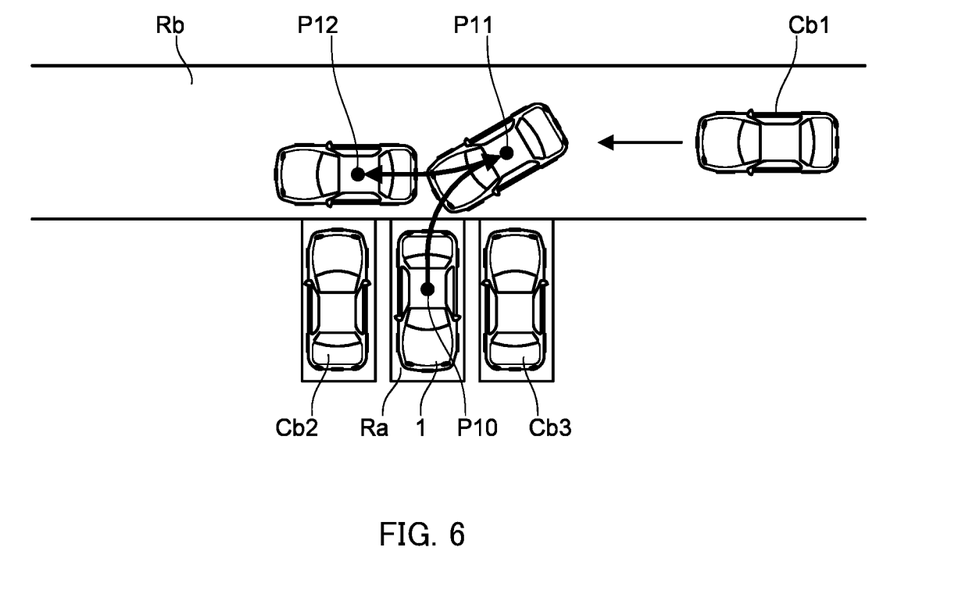
FIG. 6 is a diagram illustrating an automated pulling-out operation performed by a driving assistance apparatus according to Modification 1.

FIG. 6 is a diagram illustrating an automated pulling-out operation performed by driving assistance apparatus 10 according to Modification 1.

Modification 1 describes a pulling-out operation for automatically pulling out from a parallel-parked state with vehicle 1 facing forward. In FIG. 6, point P10 represents an initial position, point P12 a pulling-out completion position, and the heavy arrow (point P10 to point P11, and point P11 to point P12) a movement path during automated pulling out of vehicle 1. Note that in Modification 1, point P11 is the mode change point.

Also in Modification 1, first, driving assistance apparatus 10 determines pulling-out completion position P12 on the basis of the current position of vehicle 1 and the surroundings information of vehicle 1, and determines the movement path from current position P10 to pulling-out completion position P12. Then, driving assistance apparatus 10 sets the mode change point at position P11 where no turning movement is required thereafter in the movement path. Note that here, when vehicle 1 is turned, a large part of vehicle 1 has to be protruded to road region Rb, and as such driving assistance apparatus 10 sets position P11 for turning vehicle 1 as the mode change point.

Next, driving assistance apparatus 10 runs vehicle 1 in the first automated driving mode from initial position P10 to intermediate position P11 (here, a turning point) along the previously determined movement path. Then, after temporarily stopping vehicle 1 at intermediate position P11, driving assistance apparatus 10 switches the mode from the first automated driving mode to the second automated driving mode and runs vehicle 1 along the previously determined movement path. Thereafter, when a steering operation is performed by the user in the final section (i.e., between the mode change point P11 and pulling-out completion position P12) in the previously determined movement path, driving assistance apparatus 10 switches the mode from the second automated driving mode to the manual driving mode in response to the operation.

In this manner, also when vehicle 1 is automatically pulled out from a parallel parking state with vehicle 1 facing backward through a vehicle control using driving assistance apparatus 10 according to Modification 1, it is possible to switch from the automated driving mode to the manual driving mode without stopping vehicle 1 at pulling-out completion position P12 in road region Rb.

Modification 2

Figure 7:
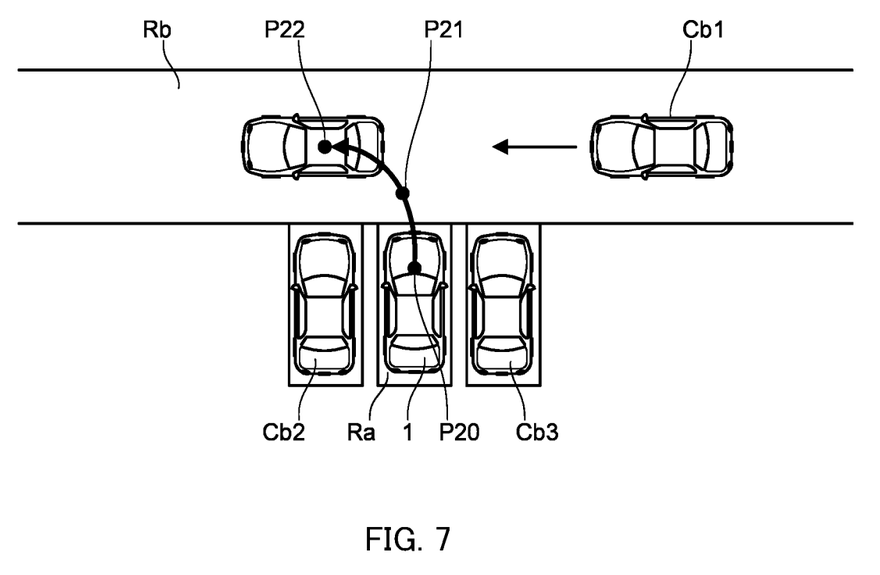
FIG. 7 is a diagram illustrating an automated pulling-out operation performed by a driving assistance apparatus according to Modification 2.

FIG. 7 is a diagram illustrating an automated pulling-out operation performed by driving assistance apparatus 10 according to Modification 2.

Modification 2 describes a pulling-out operation for automatically pulling out from a parallel-parked state with vehicle 1 facing backward. In FIG. 7, point P20 represents an initial position, point P22 a pulling-out completion position, and the heavy arrow (point P20 to point P21 and point P21 to point P22) a movement path of the vehicle during automated pulling out. Note that in Modification 2, point P21 is the mode change point.

Also in Modification 2, first, driving assistance apparatus 10 determines pulling-out completion position P22 on the basis of the current position of vehicle 1 and the surroundings information of vehicle 1, and determines the movement path from current position P20 to pulling-out completion position P22. Then, driving assistance apparatus 10 sets the mode change point to position P21 where no turning movement is required thereafter in the movement path. Note that here, driving assistance apparatus 10 sets the mode change point to point P21 where only the front part of vehicle 1 has entered road region Rb after vehicle 1 is slightly moved forward from the parking space.

Next, driving assistance apparatus 10 runs vehicle 1 in the first automated driving mode from initial position P20 to intermediate position P21 along the previously determined movement path. Then, after temporarily stopping vehicle 1 at intermediate position P21, driving assistance apparatus 10 switches the mode from the first automated driving mode to the second automated driving mode, and runs vehicle 1 along the previously determined movement path. Thereafter, when a steering operation is performed by the user in the final section (i.e., between the mode change point P21 pulling-out completion position P22) in the previously determined movement path, driving assistance apparatus 10 switches the mode from the second automated driving mode to the manual driving mode in response to the operation.

In this manner, also when automatically pulling out vehicle 1 with vehicle 1 facing forward from a parallel parking state through the vehicle control of driving assistance apparatus 10 according to the present embodiment, it is possible to switch from the automated driving mode to the manual driving mode without stopping vehicle 1 at pulling-out completion position P22 in road region Rb.

Other Embodiments

The present invention is not limited to the above-mentioned embodiment, and may be variously modified.

In the above-mentioned embodiment, the accelerator operation for vehicle 1 is left to the user while automatically controlling the steering operation for vehicle 1 in the second automated driving mode as an example of travel control section 12c of driving assistance apparatus 10. At this time, while travel control section 12c may control vehicle driving apparatus 20 to directly reflect the operation amount of the accelerator operation performed by the user, it is also possible to run vehicle 1 at a constant speed on the basis of the accelerator operation performed by the user without referring to the operation amount of the accelerator operation performed by the user for the purpose of suppressing excessive speed increase.

In addition, travel control section 12c may prohibit the steering operation by the user until the steering angle of vehicle 1 becomes the threshold value or smaller in the final section (point P2 to point P3) between intermediate position P2 and pulling-out completion position P3 in the movement path.

In addition, travel control section 12c may control vehicle 1 in the second automated driving mode from the initial position without using the first automated driving mode during automated pulling out.

In addition, in the above-mentioned embodiment, a notification to the user is made using speaker 60 as an example of notification section 12d of driving assistance apparatus 10. However, in place of speaker 60, it is possible to adopt a display using an indicator and the like as a means for making a notification to the user by notification section 12d.

In addition, in the above-mentioned embodiment, the own vehicle position is detected on the basis of the surroundings information of vehicle 1 acquired from surrounding object detection apparatus 40 as an example of driving assistance apparatus 10. However, driving assistance apparatus 10 may detect the own vehicle position using a GPS receiver provided in vehicle 1.

In addition, while control section 12 is achieved with one computer in the above-mentioned embodiment as an example of driving assistance apparatus 10, it may be naturally achieved with a plurality of computers. In addition, programs and data to be read by the computer, and data and the like written by the computer may be separately stored in a plurality of computers.

It should be understood by those skilled in the art that various modifications, combinations, sub-combinations and alterations may occur depending on design requirements and other factors in so far as they are within the scope of the appended claims or the equivalents thereof.

This application is entitled to and claims the benefit of Japanese Patent Application No. 2019-049847 filed on Mar. 18, 2019, the disclosure each of which including the specification, drawings and abstract is incorporated herein by reference in its entirety.

INDUSTRIAL APPLICABILITY

The driving assistance apparatus according to the present disclosure can achieve an automated pulling-out function that is more suitable in terms of safety and consideration for other vehicles.

What is claimed is:

1. A driving assistance apparatus configured to support a driving of a vehicle at a time of pulling out of the vehicle from a parking space to a pulling-out completion position, the driving assistance apparatus comprising:
    a processor; and
    a memory including a control program that, when executed by the processor, causes the processor to perform operations, the operations including:
    receiving an input of sensor information from a sensor, the sensor configured to monitor surroundings of the vehicle; and
    determining a movement path from a parking space, which is an initial position of the vehicle, to the pulling-out completion position, which is a predetermined position of a road region, and moving the vehicle along the movement path on a basis of surroundings information of the vehicle, the surroundings information being received when pulling out the vehicle from the parking space to the road region,
    wherein the processor leaves an accelerator operation for the vehicle to a user while automatically controlling a steering operation for the vehicle as a first automated driving mode at least in a first section from an intermediate position to the predetermined position in the movement path, and switches from an automated driving mode to a manual driving mode in response to the steering operation being performed by the user when the vehicle travels in the first section,
    the processor automatically controls the accelerator operation and the steering operation for the vehicle as a second automated driving mode in a second section from the initial position to the intermediate position in the movement path,
    the intermediate position is a position where no turning movement is required in the movement path from the intermediate position to the predetermined position,
    the intermediate position is a position where the vehicle has entered the road region by a predetermined distance from the initial position, and
    the processor switches from the second automated driving mode to the first automated driving mode at the intermediate position where the vehicle has entered the road region by a predetermined distance from the initial position.

2. The driving assistance apparatus according to claim 1, wherein when the vehicle travels in the first section and a steering angle of the vehicle becomes a threshold value or smaller, the processor notifies the user to perform the steering operation.

3. The driving assistance apparatus according to claim 1, wherein at the intermediate position, the processor temporarily stops the vehicle and notifies the user to perform the accelerator operation.

4. A vehicle comprising the driving assistance apparatus according to claim 1.

* * * * *